(12) United States Patent
Gan

(10) Patent No.: US 8,206,585 B2
(45) Date of Patent: Jun. 26, 2012

(54) AUTOMATIC OIL-WATER SEPARATION AND RECOVERY SYSTEM USED ON SHIPS

(76) Inventor: Xian Gan, Nanjing (CN)

( * ) Notice: Subject to any disclaimer, the term of this patent is extended or adjusted under 35 U.S.C. 154(b) by 206 days.

(21) Appl. No.: 12/517,114

(22) PCT Filed: Mar. 3, 2008

(86) PCT No.: PCT/CN2008/000424
§ 371 (c)(1),
(2), (4) Date: Jun. 1, 2009

(87) PCT Pub. No.: WO2008/110060

PCT Pub. Date: Sep. 18, 2008

(65) Prior Publication Data

US 2010/0065480 A1 Mar. 18, 2010

(30) Foreign Application Priority Data

Mar. 13, 2007 (CN) .......................... 2007 1 0020574

(51) Int. Cl.
*C02F 1/40* (2006.01)

(52) U.S. Cl. ........ 210/259; 210/300; 210/338; 210/491; 210/519; 210/540; 210/DIG. 5

(58) Field of Classification Search .................. 210/259, 210/299, 300, 323.2, 335, 337, 338, 488, 210/489, 491, 505, 508, 519, 540, DIG. 5
See application file for complete search history.

(56) References Cited

U.S. PATENT DOCUMENTS

| | | | |
|---|---|---|---|
| 2,624,463 A | * | 1/1953 | Freese .......................... 210/519 |
| 3,865,732 A | * | 2/1975 | Terhune et al. .......... 210/DIG. 5 |
| 4,014,791 A | * | 3/1977 | Tuttle ........................... 210/519 |

(Continued)

FOREIGN PATENT DOCUMENTS

| | | |
|---|---|---|
| CN | 2087530 | 10/1991 |
| CN | 1721029 | 1/2006 |

OTHER PUBLICATIONS

Translation of Chinese patent 1721029, Jan. 18, 2006.*

*Primary Examiner* — Christopher Upton
(74) *Attorney, Agent, or Firm* — Schmeiser, Olsen & Watts, LLP

(57) ABSTRACT

An automatic oil-water separation and recovery device, which comprises a cylindrical tank, on the top of which exists an oil collector. The tank has an inflow pipe that links to a pre-separation regulating water distributor therein. The said water distributor is in the shape of an obconic bell mouth. At the lower part of the tank stands an outflow collector on which a bar-shaped oil-water separation unit is secured. The said outflow collector has an outlet. The said oil-water separation unit is made from stainless steel or plastic antipriming pipe firstly wrapped with unwoven cloth, and then taped with wires and outside the wires further wrapped with nonwoven cloth. All the cloth and wires are made of the same highly hydrophilic, oil-resistant material. The automatic oil-water separation and recovery devices described in this invention can be assembled together for separating and recovering ship-generated oily water. The assembled system works very well even though the oil content in the oily water fluctuates significantly. The average oil content in the treated water is about or lower than 5.0 m/L.

2 Claims, 3 Drawing Sheets

U.S. PATENT DOCUMENTS

| | | | |
|---|---|---|---|
| 4,058,463 A * | 11/1977 | Bartik | 210/489 |
| 4,059,511 A * | 11/1977 | Musha et al. | 210/DIG. 5 |
| 4,139,463 A * | 2/1979 | Murphy et al. | 210/259 |
| 4,151,087 A * | 4/1979 | Sakaguchi | 210/540 |
| 4,240,908 A * | 12/1980 | Swain et al. | 210/508 |
| 4,892,667 A * | 1/1990 | Parker et al. | 210/338 |
| 5,350,527 A * | 9/1994 | Kitko | 210/259 |
| 5,597,493 A * | 1/1997 | Torini | 210/DIG. 5 |

* cited by examiner

AUTOMATIC OIL-WATER SEPARATION AND RECOVERY SYSTEM USED ON SHIPS

TECHNICAL FIELD

This invention relates to oil-water separation technique, specifically, a system for automatically separating and recovering oil from bilge water.

ART BACKGROUND

Treatment of oily wastewater generated by cruise ships has been regarded as one of worldwide challenges for eco-environmental protection for centuries. In general, oil spill pollution can be divided into three types: that caused by maritime transportation, that caused by coastal industrial activity and that occurs on inland water areas. Oil spill pollution occurring on inland water areas (including rivers and lakes) refers to the pollution of the inland water areas resulting from direct dumping of the untreated bilge water generated in the engine room of the cruise ships. This kind of pollution has engendered severe negative impact upon the fragile eco-system of inland waters in China. The negative effect has emerged in Dianchi Lake, Yunnan Province, China, and currently all diesel-engined ships are banned to enter the lake by local authority. The pollution caused by the same reason also occurred in the Three Gorges area of the Yangtze River. Besides, in July of 2007, Nanjing Maritime Agency (of Jiangsu Province, China) stipulated that drain outlets of all ships cruising in Nanjing reach of the Yangtze River should be closed. However, this method cannot solve the oil spill pollution once and for all. In China, the huge number of diesel-engined ships will definitely produce much bilge water. If effective methods are not adopted in treating the bilge water, it would pollute inland waters in one way or another even though the direct dumping is prohibited. Therefore, the crucial strategy of dealing with the wastewater pollution is to find an effective way for treating the bilge water. The characteristics of the bilge water requires special treatment: first, the oil content at different levels of the bilge water changes so greatly that it varies from several mg/L at the lower level to several hundred mg/L at the upper level. This consequently increases the difficulty of treatment. Second, engine rooms of most ships are spatially compact. The oil separation apparatus should be small and highly effective. Third, all ships work in the state of movement. Therefore, the oil separation apparatus should be designed with high and stable working performance in the state of tossing and pitching. The apparatus in this invention is the very device designed for treatment of bilge water generated by cruise ships (for both maritime and inland water transportation). Fourth, according to Resolution MEPC.107 (49) stipulated by International Maritime Organization—"Revised guidelines and specifications for pollution prevention equipment for machinery space bilges of ships"—the anti-pollution apparatus should be capable to tolerate the passage of 100% concentration of specific oil medium for five minutes while no harm occurs to the apparatus itself. This special requirement poses a demanding challenge for the design of the anti-pollution apparatus of this kind.

DISCLOSURE OF THE INVENTION

This invention relates to an automatic oil-water separation and recovery system designed for synchronic treatment of the bilge water generated during cruise. It is the further development of the China patent "Automatic Oil-water Separation and Recovery Device" (Patent No. CN200510040609.2).

The technical art of this invention includes:

An automatic oil-water separation and recovery system used on ships, comprising three cylindrical tanks A (1), B (2) and C (3). The top of each tank has an oil collector (4, 5, 6) that opens into the respective tank and can recover the oil from the wastewater. There is an inflow pipe (20) at the top of tank A (1). The untreated wastewater is led into tank A (1) through the inflow pipe (20). It streams down to the lower part of the tank through the pre-separation regulating water distributor (10) that links to the inflow pipe (20) at the top of tank A (1). The water distributor (10) is in the shape of an obconic bell mouth, whose lower mouth is linked to the inflow pipe (20). The lower part of tank A is equipped with an outflow collector (16), upon which a bar-shaped oil-water separation unit (13) is attached. This unit (13) is firstly wrapped with the nonwoven cloth made from HK oil-resistant material (35), then taped with wires made from the same material (34), and further wrapped with the nonwoven cloth made from the same material (36). (the above-mentioned HK oil-resistant material is manufactured by Nanjing Greenshield Environmental Equipments Co., Ltd.) The outflow collector (16) of tank A (1) has an outlet (24), which links to the inflow pipe (21) of tank B (2) and the pre-separation regulating water distributor (11) at the top of tank B (2). The water having been treated in tank A (1) is channeled to the water distributor (11) in tank B (2); it then streams down through the water distributor (11) to the filter (14) equipped at the lower part of tank B (2). The filter (14) is filled with active carbon (grain size: 14-18 eyes). The water is therefore further treated by the filter (14), and then through the outflow collector (17) at the lower part of tank B (2) is channeled by the inflow pipe (22) to the pre-separation regulating water distributor (12) at the top of tank C (3). The bar-shaped oil-water separation unit (15) equipped upon the outflow collector (18) at the lower part of tank C (3) is made by the same method as the said unit (13) in tank A (1). The water that has been twice treated now receives a third purification, and streams to the outlet (26) through the outflow collector (18) of tank C (3). It is then channeled into the water tank of the cooling system and used as cooling water for the ship's engine set. The bar-shaped oil-water separation unit (13), as said above, is made up of a rigid, antipriming pipe firstly wrapped with nonwoven cloth made from highly hydrophilic and oil-resistant material, then taped with wires made from the same material, and further wrapped with nonwoven cloth made from the same material.

In the above-mentioned oil-water separation and recovery system, the pre-separation regulating water distributors in the three tanks are all in the same design. The water distributors contain an obconic bell mouth that are characteristic with concentric screw slots on the inner wall.

The operating mechanism of the automatic oil-water separation and recovery system described in this invention works as follow:

When the wastewater accumulates to a certain height in the engine room, it is pumped (manually or automatically) into a separate filter filled with active carbon in order that some floating oil and other float solid grains can be removed. Then, the water is led to the pre-separation regulating water distributor (10) in tank A (1). After preliminary separation in the water distributor, the separated oil is recovered by the oil collector at the top of the tank. The wastewater after preliminary separation, driven by the pump, goes through the bar-shaped oil-water separation unit (13) at the lower part of tank A. Oil in the wastewater is filtered outside of the unit and will be automatically sent to the oil collector at the top of the tank and recovered.

The wastewater having been treated in tank A is channeled into the pre-separation regulating water distributor (11) at the top of tank B, then spills down to the filter unit (14) made of active carbon, wherein the remaining emulsified oildrops in the wastewater will be removed.

Thereafter, the water is led through the outlet of tank B to the pre-separation regulating water distributor (12) at the top of tank C. with the same method as that in tank A, oil in the wastewater will be filtered outside of the bar-shape oil separation unit (15), and automatically sent to the oil collector at the top of the tank and recovered. After oil-water separation process conducted by the unit (15) in tank C, the oil content in the wastewater is lower than 5.0 mg/L. In addition, the water after treatment is channeled to the water tank of the cooling system of the engine set. Therefore, both oil and water are recovered.

The introduction of pre-separation regulating water distributors to this oil-water separation system structurally ensures the high-gradient decrease of flow speed of wastewater when the flow diameter experiences an abrupt enlargement, which consequently facilitates coagulation of oil droplets. Furthermore, the existence of concentric screw slots on the inner wall of water distributors ensures that oil in the wastewater stays on the surface and flows towards the brim of water distributors while water in the wastewater stays at the lower part of the water distributors and flows along the normal line of slots. The different flowing modes between oil and water engender speed difference plus, which, in combination with the concentration difference between oil and water, can improve the effect of oil-water separation. The equipment of the water distributors can also effectively control cross turbulence caused by tossing of the ship.

Small size and light weight are characteristic of this automatic oil-water separation and recovery system. The system displays excellent performance during treating bilge water that contains different oil content, and the oil content after treatment is about or lower than 5.0 mg/L. Water with such low oil content can be reused as cooling water for the ship, which definitely saves the fresh-water that is particularly precious during maritime cruise. The whole system shows stable performance during operation.

The automatic oil-water separation and recovery system described in this invention can also be employed in treatment of oil spill accidents that occur in maritime transportation. Not only can it lower down the environmental damage, but also it can efficiently recover spilt oil.

In the said figures: 1 tank A; 2 tank B; 3 tank C; 4 oil collector of tank A; 5 oil collector of tank B; 6 oil collector of tank C; 7 oil recovery pipe of tank A; 8 oil recovery pipe of tank B; 9 oil recovery pipe of tank C; 10 pre-separation regulating water distributor of tank A; 11 pre-separation regulating water distributor of tank B; 12 pre-separation regulating water distributor of tank C; 13 HK oil-water separation unit of tank A; 14 active carbon filter unit of tank B; 15 HK oil-water separation unit of tank C; 16 outflow collector of tank A; 17 outflow collector of tank B; 18 outflow collector of tank C; 19 pump; 20 inflow pipe for bilge water (untreated water); 21 inflow pipe of tank B; 22 inflow pipe of tank C; 23 flow meter; 24 outlet of tank A; 25 outlet of tank B; 26 outlet of tank C; 27 drain outlet; 28 water pressure gauge; 29 control box; 30 filtering bar sintered by active carbon Preferred Embodiments of the Invention Embodiment 1

Figure 1:
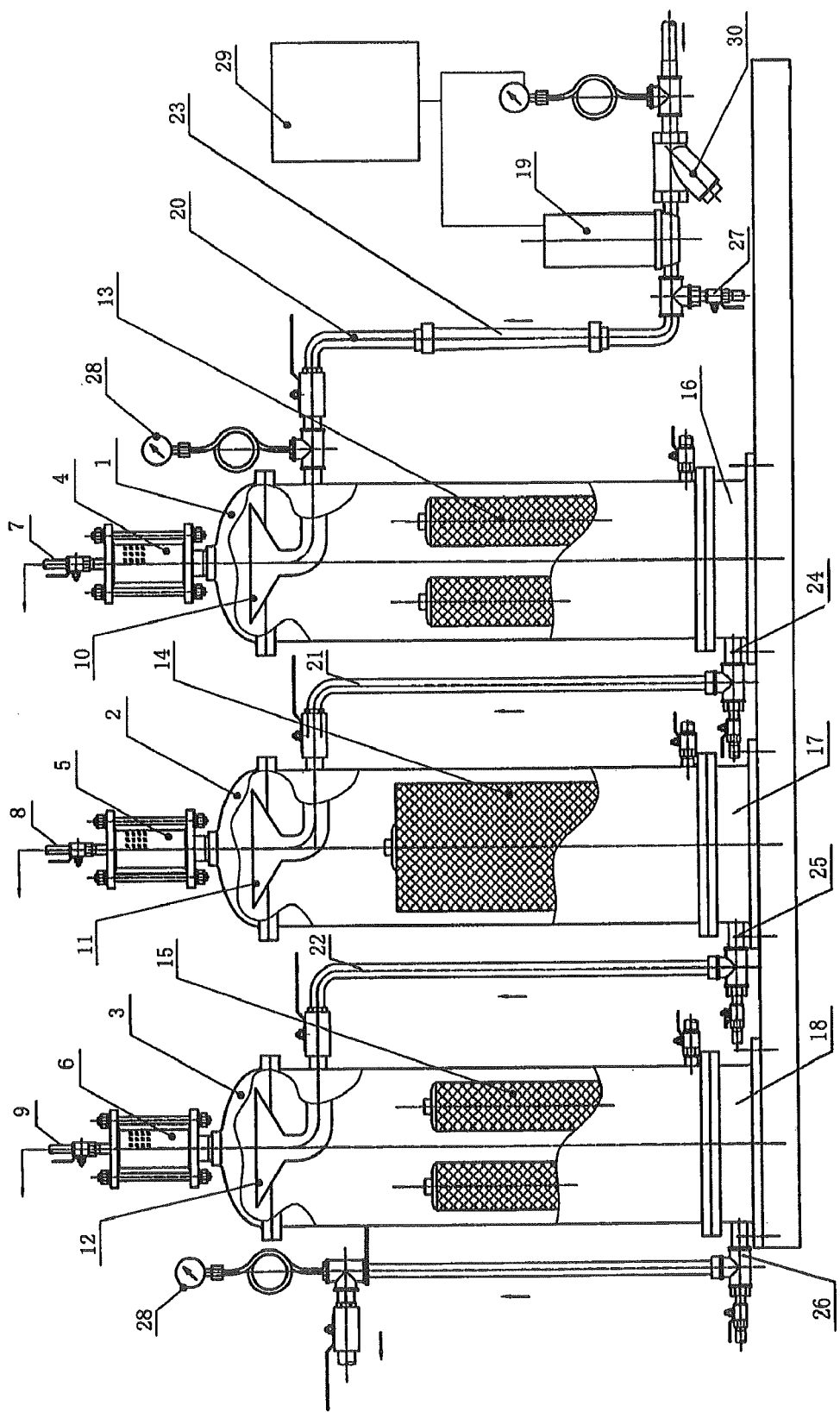
FIG. 1: general structure of the automatic oil-water separation and recovery system described in this invention.
Figure 2:
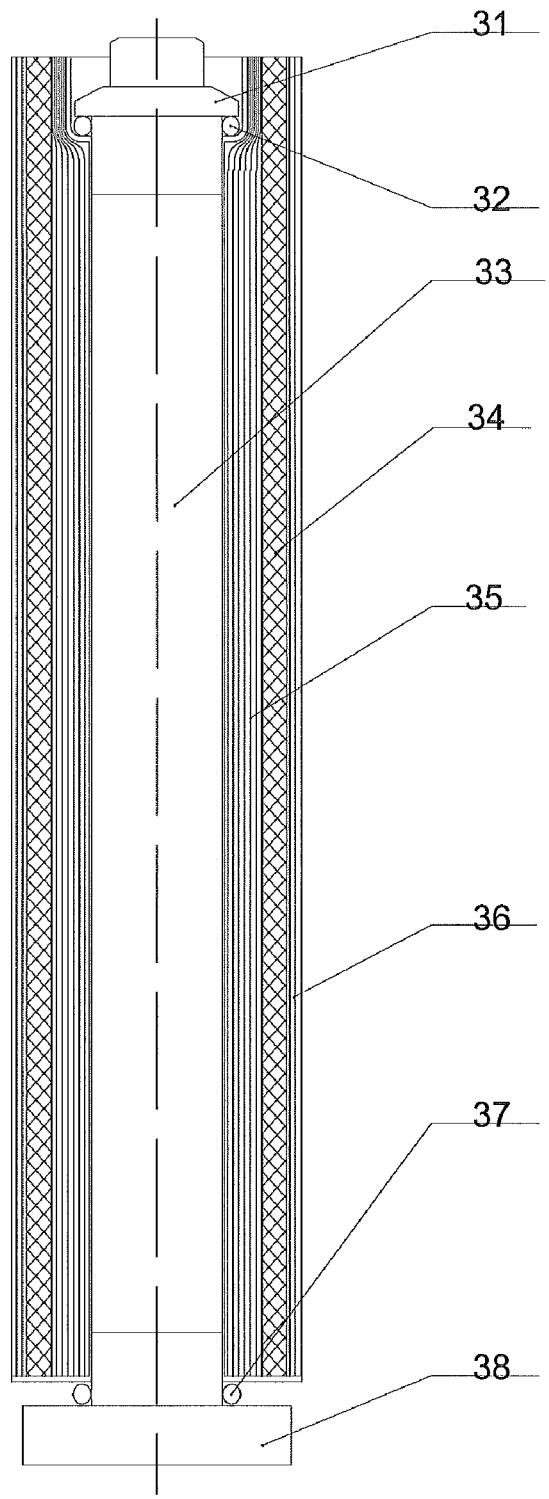
FIG. 2: general structure of the bar-shaped oil-water separation unit.
Figure 3:
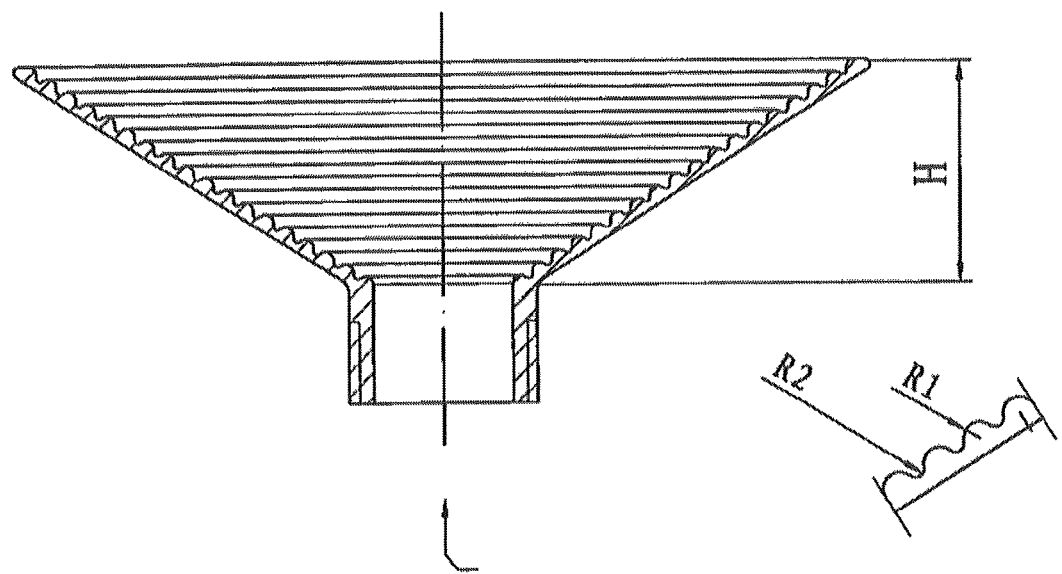
FIG. 3: general structure of the pre-separation regulating water distributor

An automatic oil-water separation and recovery system, as illustrated in FIG. 1. A water pressure gauge (28), a filtering bar (30), a pump (19) and a flow meter (23) are equipped on the inflow pipe (20). The inflow pipe (20) projects into the upper part of tank A and links to the water distributor (10) therein. The diameter of the obconic bell mouth's upper mouth is 160 mm and that of the bell mouth's lower mouth is 16 mm. The vector height of the bell mouth is 40 mm. There are concentric screw slots on the inner wall of the bell mouth. Tank A (1), made of stainless steel, is 200 mm in diameter and 800 mm in height, at the top of which exists an oil collector (4) that is open to the tank and has a recovery pipe (7) at the top. At the lower part of tank A (1) stands an outflow collector (16), on which three round holes are evenly-drilled and each hole secures a pedestal (38) on which a bar-shaped HK oil separation unit (13) is equipped. The outflow collector (16) of tank A (1) is connected with the inflow pipe (21) of tank B (2). The pipe (21) projects into the upper part of tank B and links to the water distributor (11) therein. The design of the water distributor (11) in tank B (2) is the same as that (10) in tank A. Tank B is also made of stainless steel, and is 200 mm in diameter and 800 mm in height. At the top of the tank exists an oil collector (5) that is open to it and has a recovery pipe (8) at the top. There is an outflow collector (17) at the lower part of tank B (2), on which a filter (14) made of active carbon (grain size: 14-18 eyes) is secured. The wastewater treated by tank B streams through the outflow pipe (25) at the low part of tank B (2) to tank C (3) via the inflow pipe (22) that links to the outflow pipe (25). Thereafter, it is firstly treated by the pre-separation regulating water distributor (12) in tank C (3) and then flows down to the lower part of the tank and is deoiled by HK oil-water separation unit (15) therein. After treatment, the water is channeled to the water tank of the cooling system through the outlet (26) of the outflow collector (18) that is at the lower part of tank C (3). The bar-shaped HK oil separation unit (15) aforesaid is made from a stainless steel or plastic antipriming pipe firstly wrapped with HK oil-resistant non-woven cloth (35) (manufactured by Nanjing Greenshield Environmental Equipments Co., Ltd.), and then five-foldedly taped with wires (34) of the same material, and outside the wires further wrapped with two layers of nonwoven cloth (36) of the same material. There is an outlet (26) at the bottom of the outflow collector (18), which channels the treated water to the water tank.

Insofar as the system illustrated in Embodiment 1 is adopted, the oil content in the untreated water and the treated water is indicated respectively in the following (when the inflow speed is 200 L/h):

| oil content in the sample water (mg/L) | | | | |
|---|---|---|---|---|
| untreated | 1.06 | 20.33 | 212.55 | 196.02 |
| treated | 0.40 | 1.01 | 2.03 | 2.00 | note:
testing device: COMA Oil Analyzer (the same hereafter)

Embodiment 2

An automatic oil-water separation and recovery system, sharing the same general structure as that above-mentioned in Embodiment 1. The differences are: the diameter of the lower mouths of the pre-separation regulating water distributors (10, 11, 12) changes to 26 mm, and the vector height of which changes to 30 mm.

Insofar as the system illustrated in Embodiment 2 is adopted, the oil content in the untreated water and the treated water is indicated respectively in the following (when the inflow speed is 500 L/h):

| oil content in the sample water (mg/L) | | | | |
|---|---|---|---|---|
| untreated | 1.50 | 2.43 | 1.97 | 3.98 |
| treated | 0.49 | 0.51 | 0.55 | 0.50 |

Embodiment 3

An automatic oil-water separation and recovery system, sharing the same general structure as that above-mentioned in Embodiment 1. The differences are: the diameter of the lower mouths of the pre-separation regulating water distributors (10, 11, 12) changes to 20 mm, and the vector height of which changes to 30 mm.

Insofar as the system illustrated in Embodiment 3 is adopted, the oil content in the untreated water and the treated water is indicated respectively in the following (when the inflow speed is 400 L/h):

| oil content in the sample water (mg/L) | | | | |
|---|---|---|---|---|
| Untreated | 2.09 | 17.10 | 223.33 | 298.66 |
| treated | 0.49 | 0.51 | 2.30 | 2.45 |

Embodiment 4

An automatic oil-water separation and recovery system, sharing the same general structure as that above-mentioned in Embodiment 1. The differences are: the diameter of the lower mouths of the pre-separation regulating water distributors (10, 11, 12) changes to 20 mm, and the vector height of which changes to 35 mm.

Insofar as the system illustrated in Embodiment 4 is adopted, the oil content in the untreated water and the treated water is indicated respectively in the following (when the inflow speed is 200 L/h):

| oil content in the sample water (mg/L) | | | | |
|---|---|---|---|---|
| Untreated | 254 | 255 | 206 | 233 |
| treated | 1.93 | 3.21 | 2.89 | 2.26 |

Embodiment 5

An automatic oil-water separation and recovery system, sharing the same general structure as that above-mentioned in Embodiment 1. The oil content in the untreated water and the treated water was tested by an authoritative environmental monitoring organization—Jiangsu Environmental Monitoring Center. The result was shown as follow (when the inflow speed was 200 L/h and oil content in the untreated water was low):

| Conducted on Jan. 31, 2007 | | |
|---|---|---|
| Sample number | oil type (mg/L) | |
| (low content sample) | inlet | outlet |
| $1^{st}$ time | 1.22 | 0.46 |
| $2^{nd}$ time | 1.47 | 0.48 |
| $3^{rd}$ time | 2.53 | 0.50 |
| $4^{th}$ time | 1.38 | 0.51 |
| $5^{th}$ time | 2.19 | 0.60 |
| $6^{th}$ time | 2.62 | 0.47 |
| $7^{th}$ time | 1.84 | 0.46 |
| $8^{th}$ time | 2.06 | 0.54 |
| standard value | / | 15 |
| up to the standard or not | / | Yes |
| average treatment efficiency (%) | 73.7% | |

Embodiment 6

An automatic oil-water separation and recovery system, sharing the same general structure as that above-mentioned in Embodiment 1 and Embodiment 5. The difference is that the oil content in the untreated bilge water is higher than that in Embodiment 5. The oil content in the untreated water and the treated water was tested by an authoritative environmental monitoring organization—Jiangsu Environmental Monitoring Center. The result was shown as follow (when the inflow speed was 200 L/h and oil content in the untreated water was high):

| conducted on Feb. 7, 2007 | | |
|---|---|---|
| Sample number | oil type (mg/L) | |
| (low content sample) | inlet | outlet |
| $1^{st}$ time | 254 | 1.93 |
| $2^{nd}$ time | 255 | 3.21 |
| $3^{rd}$ time | 206 | 2.89 |
| $4^{th}$ time | 223 | 2.26 |
| standard value | / | 15 |
| up to the standard or not | / | Yes |
| average treatment efficiency (%) | 98.9% | |

What is claimed:
1. An automatic oil-water separation and recovery device comprising:
   a cylindrical tank;
   an oil collector on a top of the cylindrical tank, wherein the oil collector links to an oil recovery pipe;
   an inflow pipe at the top of the cylindrical tank which leads untreated water into a pre-separation regulating water distributor in an upper part of the cylindrical tank, the pre-separation regulating water distributor is in a shape of an obconic bell mouth and includes a plurality of concentric ridges on an inner wall of the obconic bell mouth, wherein the inflow pipe links to a lower mouth of the obconic bell mouth;
   an outflow collector at a lower part of the cylindrical tank on which a bar-shaped oil-water separation unit is secured, the said outflow collector having an outlet, wherein the oil-water separation unit is made from at least one of stainless steel and plastic antipriming pipe firstly wrapped with an unwoven cloth, and then taped with a wire, and outside the wire the antipriming pipe is further wrapped with a nonwoven cloth, further wherein the unwoven cloth, the wire, and the nonwoven cloth are made of the same highly hydrophilic oil-resistant material.

2. An automatic oil-water separation and recovery device comprising;
- a first cylindrical tank, a second cylindrical tank, and a third cylindrical tank;
- an oil collector at a top of each of the first cylindrical tank, the second cylindrical tank, and the third cylindrical tank which are open into the first cylindrical tank, the second cylindrical tank, and the third cylindrical tank and link to an oil recovery pipe of each of the first cylindrical tank, the second cylindrical tank, and the third cylindrical tank;
- a first inflow pipe at a top of the first cylindrical tank which connects with a pump and a bar-shaped filter made of sintered carbon, wherein untreated water is pumped by the pump into the first cylindrical tank through the first inflow pipe and preliminarily filtered by a first filter;
- a first pre-separation regulating water distributor linked to the first inflow pipe in an upper part of the first cylindrical tank,
- wherein the water treated by the first pre-separation regulating water distributor is then channeled to a lower part of the first cylindrical tank, the first pre-separation regulating water distributor is in a shape of an obconic bell mouth and includes a plurality of concentric ridges on an inner wall of the obconic bell mouth, wherein the first inflow pipe links to a lower mouth;
- a first outflow collector at a lower part of the first cylindrical tank on which a first bar-shaped oil-water separation unit is secured, the outflow collector of the first cylindrical tank having an outlet which connects with a second inflow pipe of the second cylindrical tank and a second pre-separation regulating water distributor in an upper part of the second cylindrical tank, wherein the water having been treated in the first cylindrical tank is channeled to the second pre-separation regulating water distributor in the second cylindrical tank and then streams down through the second preseparation regulating water distributor to a second filter equipped at a lower part of the second cylindrical tank, further wherein the second filter is filled with active carbon to treat the water
- a second outflow collector at the lower part of the second cylindrical tank that channels the treated water by the second filter by the second inflow pipe to a pre-separation regulating water distributor at a top of the third cylindrical tank;
- a second bar-shaped oil-water separation unit equipped upon a third outflow collector at a lower part of the third cylindrical tank, wherein the treated water then streams to an outlet through the third outflow collector of tank and flows into a water storage tank;
- wherein the first bar-shaped oil-water separation unit and the second bar-shaped oil-water separation unit is made up of a rigid, antipriming pipe firstly wrapped with a nonwoven cloth made from a highly hydrophilic oil-resistant material, then taped with a wire made from the same material, and further wrapped with a nonwoven cloth made from the same material.

* * * * *

UNITED STATES PATENT AND TRADEMARK OFFICE
CERTIFICATE OF CORRECTION

PATENT NO. : 8,206,585 B2
APPLICATION NO. : 12/517114
DATED : June 26, 2012
INVENTOR(S) : Xian Gan It is certified that error appears in the above-identified patent and that said Letters Patent is hereby corrected as shown below:

Claim 2. Column 8, Line 22, delete "third outflow collector of tank", insert -- third outflow collector of the third cylindrical tank --

Signed and Sealed this
Twenty-fifth Day of September, 2012

David J. Kappos
*Director of the United States Patent and Trademark Office*